(12) United States Patent
Lee

(10) Patent No.: US 6,554,304 B2
(45) Date of Patent: Apr. 29, 2003

(54) STEERING GEAR FRAME

(75) Inventor: Un-Koo Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/141,813

(22) Filed: May 10, 2002

(65) Prior Publication Data

US 2002/0125671 A1 Sep. 12, 2002

Related U.S. Application Data

(62) Division of application No. 09/750,347, filed on Dec. 29, 2000, now Pat. No. 6,425,592.

(30) Foreign Application Priority Data

Aug. 24, 2000 (KR) .......................................... 2000-49152

(51) Int. Cl.[7] .............................. B62D 3/12; B62D 1/16
(52) U.S. Cl. .................................. 280/93.515; 280/779
(58) Field of Search ..................... 280/93.515, 124.109, 280/781, 779

(56) References Cited

U.S. PATENT DOCUMENTS

| | | | | |
|---|---|---|---|---|
| 1,111,360 A | * | 9/1914 | Carpenter et al. .......... 280/779 |
| 1,461,210 A | * | 7/1923 | Corley .......................... 280/779 |
| 1,485,922 A | * | 3/1924 | Higgins ....................... 280/779 |
| 3,869,139 A | | 3/1975 | Gage |
| 3,929,030 A | | 12/1975 | Sukeshita |
| 3,958,462 A | | 5/1976 | Matschinsky et al. |
| 4,531,426 A | | 7/1985 | Iijima |
| 4,671,536 A | * | 6/1987 | Yoshimura ................. 280/779 |
| 4,682,788 A | * | 7/1987 | Yoshimura ................. 280/779 |
| 4,817,973 A | | 4/1989 | Takeda |
| 4,964,651 A | | 10/1990 | Kubo |
| 5,251,932 A | | 10/1993 | Ide |
| 5,547,224 A | | 8/1996 | Kami et al. |
| 5,613,709 A | | 3/1997 | Nakamichi |
| 5,876,065 A | | 3/1999 | Ogura et al. |
| 5,918,893 A | | 7/1999 | Marquardt et al. |
| 5,997,038 A | | 12/1999 | Dostert et al. |
| 6,032,981 A | * | 3/2000 | Imanishi et al. ............ 280/779 |
| 6,085,856 A | | 7/2000 | Law et al. |
| 6,149,197 A | | 11/2000 | Ishii et al. |
| 6,189,902 B1 | | 2/2001 | Lenzen, Jr. et al. |
| 6,237,956 B1 | * | 5/2001 | Haba et al. ................. 280/779 |

FOREIGN PATENT DOCUMENTS

| | | |
|---|---|---|
| JP | 5112253 A | 5/1993 |
| JP | 6122378 A | 5/1994 |
| JP | 6122379 A | 5/1994 |
| JP | 11115807 A | 4/1999 |
| WO | 90/05083 | 5/1990 |

* cited by examiner

Primary Examiner—Paul N. Dickson
Assistant Examiner—Joselyn Y Sliteris
(74) Attorney, Agent, or Firm—Birch, Stewart, Kolasch & Birch, LLP

(57) ABSTRACT

A steering gear frame includes upper and lower plates joined together at flange portions to define an inner space, a steering gearbox disposed to directly contact at least one of the upper and lower plates without using a bracket, and a fixing member for fixing the steering gearbox in a state where the steering gearbox is disposed to directly contact at least one of the upper and lower plates.

1 Claim, 4 Drawing Sheets

STEERING GEAR FRAME

This application is a divisional of application Ser. No. 09/750,347, filed on Dec. 29, 2000, now U.S. Pat. No. 6,425,592, the entire contents of which are hereby incorporated by reference and for which priority is claimed under 35 U.S.C. §120; and this application claims priority of Application No. 2000-49152 fled in Korea on Aug. 24, 2000 under 35 U.S.C. §119.

BACKGROUND OF THE INVENTION (a) Field of the Invention

The present invention relates to a steering gear frame, which is formed by integrating a conventional suspension sub-frame and a steering gear box with each other to support a steering gearbox assembly and a control links of a suspension system.

(b) Description of the Related Art

Generally, a conventional suspension sub-frame is a part of a front wheel suspension system that is laterally arranged on a vehicle body to connect the suspension system to the vehicle body.

Accordingly, since the suspension sub-frame highly affects the rigidity of the vehicle, it has to have rigidity higher than a predetermined level.

FIGS. 5 and 6 show a conventional suspension sub-frame and a steering gearbox supported by the sub-frame.

As shown in the drawings, the conventional suspension sub-frame 100 comprises upper and lower plates 102 and 104 formed through a press process. The upper and lower plates 102 and 104 are joined together at their flange portions through a welding process, thereby defining a sealed tube having a predetermined shape.

The upper plate 102 is elevated at its rear-middle portion to define an elevated portion 106 on both sides of which mounting brackets 110 are formed. The steering gearbox assembly 108 is fixed on the brackets 110 by fasteners 112.

In addition, the suspension sub-frame frame 100 is provided with mounts 114 for mounting on the vehicle body.

When the suspension sub-frame 100 and the steering gearbox assembly 108 are separately made and assembled together, the suspension sub-frame 100 should be formed having a sufficient rigidity so that it works well, resulting in increasing its size and weight.

Furthermore, the elevated portion 106 for supporting the steering gearbox assembly 108 causes an increase of weight and a reduction in space in the engine compartment.

In addition, the assembly of the suspension sub-frame 100 and the steering gearbox assembly 108 is time-consuming and increases the manufacturing costs.

SUMMARY OF THE INVENTION

Therefore, the present invention is made in an effort to solve the above-described problems.

It is an objective of the present invention to provide a steering gear frame that is minimized in its size and increased in its rigidity, thereby increasing the engine compartment space and reducing the weight of the vehicle body.

It is another objective of the present invention to provide a steering gear frame having a simple structure that can be easily assembled, thereby shortening the assembling time and reducing the manufacturing costs.

To achieve the above objectives, the present invention provides a steering gear frame comprising upper and lower plates joined together at flange portions to define an inner space; a steering gearbox disposed to directly contact at least one of the upper and lower plates without using a bracket; and means for fixing the steering gearbox in a state where the steering gearbox is disposed to directly contact at least one of the upper and lower plates.

According to a first embodiment of the present invention, the upper plate is provided with a concave portion indented toward the inner space, the steering gearbox is closely disposed in the concave portion, and the means for fixing comprises a fixing plate welded on the upper plate while covering the steering gearbox.

According to a second embodiment of the present invention, the lower plate is provided with a concave portion indented toward the inner space, the steering gearbox is closely disposed in the concave portion, and the means for fixing comprises a fixing plate fixed on the lower plate while covering the steering gearbox.

According to a third embodiment of the present invention, the steering gearbox is fixed in the inner space defined between the upper and lower plates. The steering gear frame may further comprise a reinforcing plate fixed on the lower plate while defining a predetermined space.

According to a fourth embodiment of the present invention, the upper plate is provided with a concave portion indented toward the inner space, the steering gearbox is closely disposed in the concave portion, and the means for fixing comprises welding which fixes the steering gearbox on the upper plate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described hereinafter with reference to the accompanying drawings.

Figure 1:
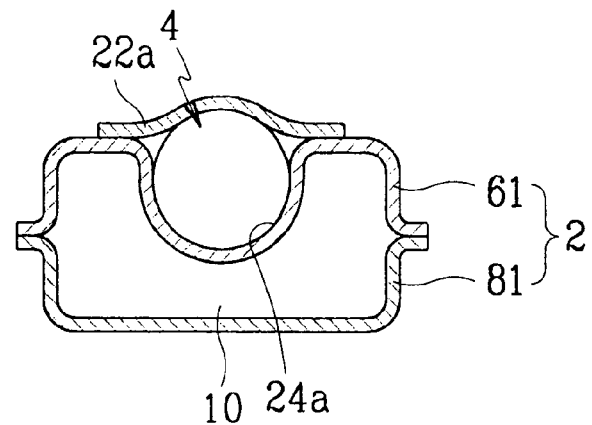
FIG. 1 is a sectional view of a steering gear frame according to a first embodiment of the present invention.

FIG. 1 shows a steering gear frame according to a first embodiment of the present invention.

The inventive steering gear frame 2 comprises upper and lower plates 61 and 81, which are press-processed in a predetermined shape according to a design specification.

The upper and lower plates 61 and 81 are joined together at their flange portions by welding, defining a sealed tube having a space 10.

The steering gear frame 2 is provided with mounts (not shown) for mounting to a vehicle body. The steering gear frame 2 is further provided with suspension mounts on which control arms of a suspension system are mounted.

As a feature of the present invention, the steering gear frame 2 is integrally formed with a steering gearbox assembly 4. That is, a concave portion 24a indented toward the space 10 is formed on the upper plate 61, and the steering gearbox assembly 4 is closely inserted into the concave portion 24a, and a fixing member 22a is welded on the upper plate 61 to fix the steering gearbox assembly 4, thereby integrating the steering gearbox assembly 4 with the upper plate 61.

The concave portion 24a is designed having a size capable of receiving a power cylinder (not shown) of the steering gearbox assembly 4. In addition, the concave portion 24a and the fixing member 22a may function as the power cylinder. That is, a rack gear can be directly disposed in a space defined by the concave portion 24a and the fixing member 22a without the power cylinder.

When fixing the steering gearbox assembly 4 using the fixing member 22a, either a bolt coupling manner or a welding manner can be employed, but the latter is more preferable in terms of rigidity.

As described above, since the steering gearbox assembly 4 is integrally mounted on the upper surface of the upper plate 61 of the steering gear frame 2, the whole size of the frame 2 can be minimized as there is no necessity for the elevated portion and the mounting brackets of the prior art.

Since the size of the steering gear frame 2 is reduced, it becomes easy to obtain a space for it in the engine compartment. In addition, since the number of components can be reduced, the manufacturing costs can be lowered.

Furthermore, since the steering gearbox assembly 4 is integrated with the steering gear frame 2, it functions as a structure of the steering gear frame 2 to increase the rigidity.

Figure 2:
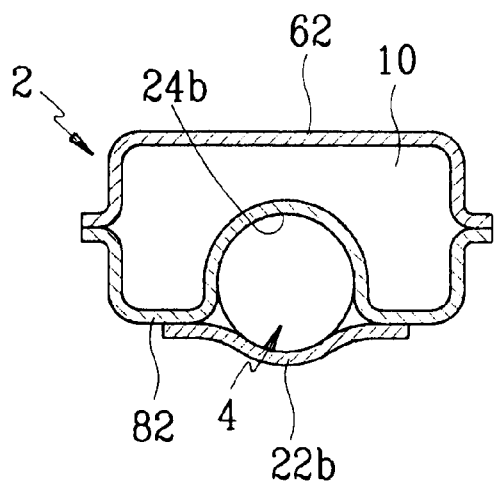
FIG. 2 is a sectional view of a steering gear frame according to a second embodiment of the present invention.

FIG. 2 shows a steering gear frame according to a second embodiment of the present invention.

In this embodiment, a bottom-middle portion of the lower plate 82 of the steering gear frame 2 is indented inward to define a concave portion 24b in which the steering gearbox assembly 4 is disposed. A fixing member 22b is fixed on the bottom of the lower plate 82 while tightly integrating the steering gearbox assembly 4 with the lower plate 82 joined with the upper plate 62.

Figure 3:
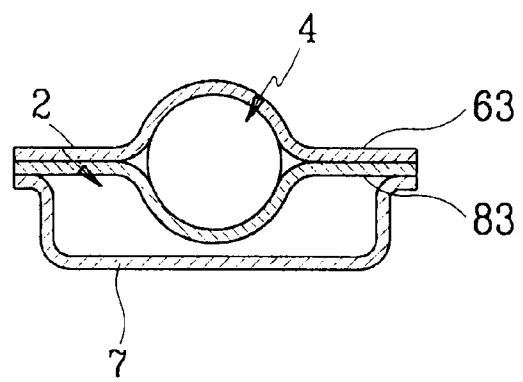
FIG. 3 is a sectional view of a steering gear frame according to a third embodiment of the present invention.

FIG. 3 shows a steering gear frame according to a third embodiment of the present invention.

In this embodiment, the steering gearbox assembly 4 is disposed within the sealed tube defined by upper and lower plates 63 and 83 of the steering gear frame 2.

That is, the steering gearbox assembly 4 is integrally disposed between upper and lower plates 63 and 83 whose flanges are welded to each other.

In this embodiment, the steering gearbox assembly 4 further comprises preferably a reinforcing plate 7 for enhancing the rigidity of the frame, which is welded on the lower plate 83, while defining a space.

Figure 4:
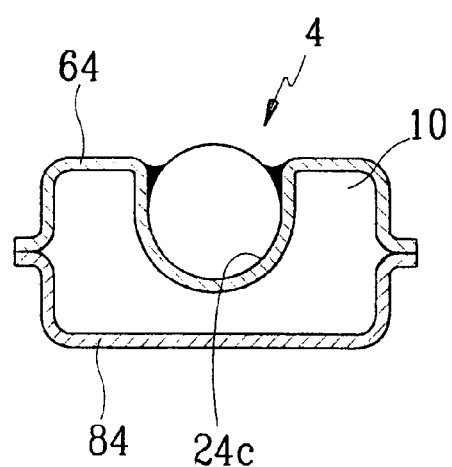
FIG. 4 is a sectional view of a steering gear frame according to a fourth embodiment of the present invention.
Figure 5:
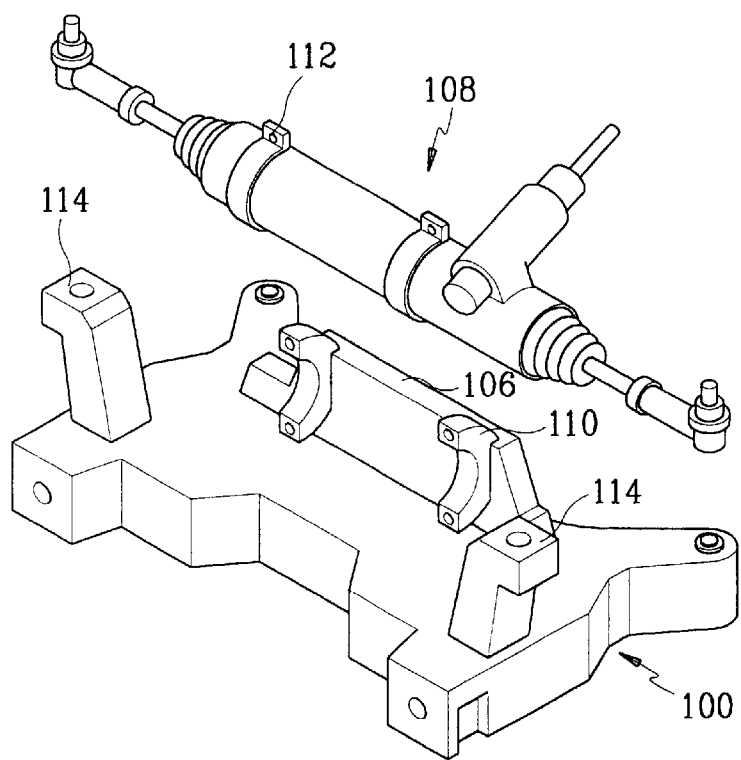
FIG. 5 is a perspective view of a conventional suspension sub-frame and a steering gearbox assembly.
Figure 6:
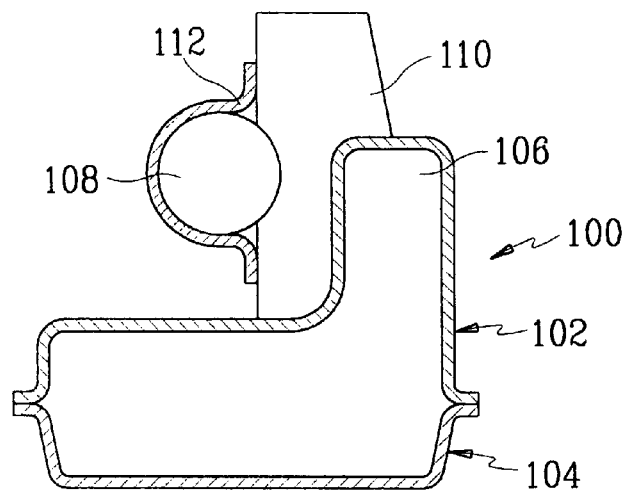
FIG. 6 is a sectional view of FIG. 5.

FIG. 4 shows a steering gear frame according to a fourth embodiment of the present invention.

This embodiment is identical to the first embodiment except for the fixing member 22a.

That is, as shown in the drawing, the upper plate 6 of the steering gear frame assembly 2 is indented inward forming a concave portion 24C, and the power cylinder 16 of the steering gearbox assembly 4 is disposed and welded on the upper plate 6.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A steering gear frame comprising:

upper and lower plates joined together at flange portions such that a sealed tube is formed between the upper and lower plates;

a steering gearbox disposed in the sealed tube; and a reinforcing plate fixed on the lower plate while defining a predetermined space.

\* \* \* \* \*